March 21, 1961 E. V. MEREDITH 2,976,069
DOWEL PIN
Filed April 9, 1959
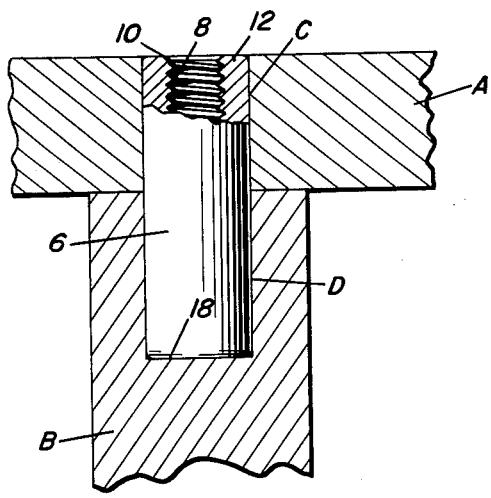
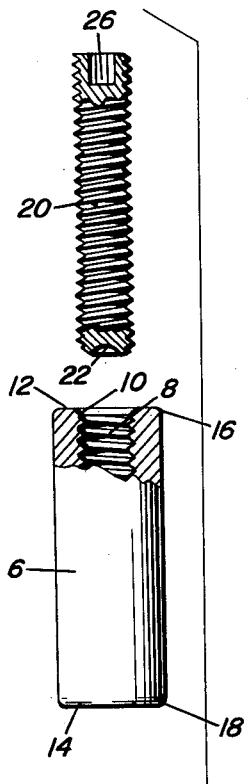
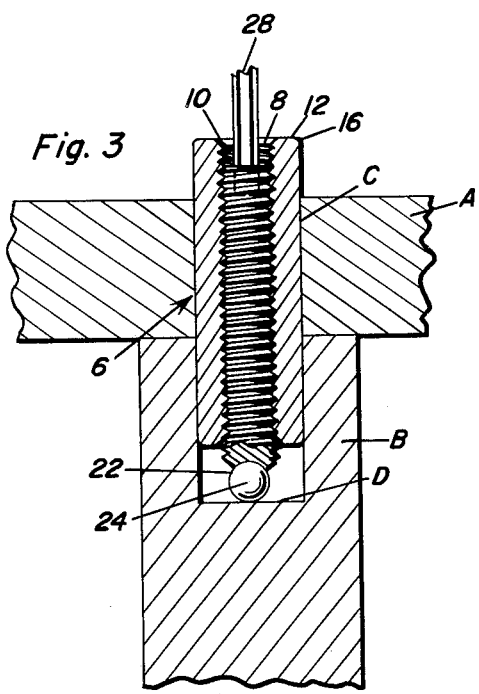
Eugene V. Meredith
INVENTOR.

United States Patent Office 2,976,069
Patented Mar. 21, 1961

2,976,069
DOWEL PIN
Eugene V. Meredith, R.D. 1, Apalachin, N.Y.
Filed Apr. 9, 1959, Ser. No. 805,221
3 Claims. (Cl. 287—127)

The present invention relates to an improved dowel pin which is adapted to be inserted and used in an ordinary manner in a blind hole or socket much in the manner that any dowel pin would be commonly utilized.

The ordinary or common dowel pin is solid. Consequently, when it is fitted into a hole in one workpiece and then telescoped and shoved into a blind hole or socket in a complemental workpiece, the air compressed ahead of the same as it slips into the socket is sometimes difficult to cope with. In some instances, it produces bulging and/or cracking of the stock with the resultant loss of time and material. It follows that one object of the instant concept is to provide a dowel pin which has an air venting passage, preferably an axial passage which extends completely through the dowel pin and through the opposite beading and trailing end of the dowel pin. The obvious purpose is to make for the escape of air and to consequently assist in piloting the dowel pin into the blind hole or socket all the way to the bottom thereof.

Another object of the invention is to provide a dowel pin having a bore extending completely therethrough and through the opposite ends and wherein said bore is screw-threaded. The screw threads serve to accommodate an insertable and removable setscrew which in effect becomes a jack screw and which has a leading end formed with a concave recess providing a seat for a thrust ball. It follows that extraction of the dowel when necessary is a simplified procedure. That is to say the ball bearing is dropped into the blind hole by way of the threaded passage in the dowel pin. The setscrew is then screwed down and brought into engagement with the ball bearing and the pressure of the screw against the ball bearing backs the dowel pin out with a minimum of difficulty.

Other objects, features and advantages will become more readily apparent from the following description and the accompanying illustrative, but not restrictive, drawings.

In the drawings, wherein like numerals are employed to designate like parts throughout the views:

Fig. 1 is a view showing fragmentary portions of the workpieces or parts which are to be temporarily or otherwise connected by an insertable and removable dowel pin, the dowel pin being shown partly in section.

Fig. 2 is an exploded view showing the complete screw-equipped dowel pin and the companion end thrust ball.

Fig. 3 is a view similar to Fig. 1 but appearing in section with parts in elevation and illustrating the jack action of the setscrew and how it comes into play to assist in backing the dowel pin out.

Referring now to the drawings with the aid of reference numerals and accompanying lead lines, one workpiece is denoted at A and the other companion workpiece by the letter B. These are illustrative of any equivalent components which are intended to be connected temporarily or otherwise by way of a dowel pin. The part A has a dowel pin hole C extending therethrough and registering with the open or mouth end of the blind hole or socket D. The improved dowel pin is of a length to perform the connecting and interlocking service depicted in Figs. 1 and 3. With reference to Fig. 2 the dowel pin is of prescribed length and cross-section and is denoted generally by the numeral 6. This dowel pin may be constructed of any suitable material. There is an axial bore extending completely through the central portion of the dowel pin and this bore is screw-threaded as at 8. It will be noticed that the screw threads purposely terminate short or inwardly of the respective counterbored ends 10. Either end 12 or 14 may be considered the leading or trailing end, as the case may be, of the dowel pin. The outer perimeter edges of the respective ends are rounded off to avoid the presence of sharp corners as denoted at 16 and 18. The "setscrew" is denoted by the numeral 20 and is of requisite length to cooperate with the screw-threaded bore. The lower or leading end has a concave recess 22 formed therein to accommodate and seat a segmental portion of the end thrust ball (simple ball bearing) 24. The upper end of the setscrew has a tool socket 26 therein to accommodate the insertable and removable operating tool 28. In Fig. 1 the observer is looking at the dowel pin by itself fitted into the holes C and D in the parts or components A and B. This is the normal assembling and retaining position of this improved dowel pin. Obviously, as the dowel pin is slipped into position through the hole C and telescopes into the blind socket or hole D the threaded passage or bore provides suitable air relief fit. When it is desired to remove the dowel the setscrew 20 is screwed into place in the manner illustrated in Fig. 3 and the tool is turned to cause the setscrew to function as a jack screw and to thus progressively dislodge and remove the dowel pin from the socket D and attending hole C. Thus, it follows that the dowel pin is easier to press or drive in and also easier to dislodge and extract from fixtures, dies, motors, machinery parts or simple "workpieces." It is repeated that the hole in the center lets the air in the shank or setscrew to escape instead of being compressed and interfering with the insertion or screwing-in step. The extraction or removal step is equally simple and successful. The ball bearing is dropped into the threaded bore and allowed to come to rest at the bottom of the socket. Then, the setscrew is inserted and screwed down until it comes into engagement with the ball whereupon the ball becomes an end thrust element. It facilitates turning the jack screw and also expedites the extraction step.

From the foregoing, the construction and operation of the device will be readily undersood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A dowel pin comprising an elongated dowel having generally flat leading and trailing ends with rounded marginal edge corners and having an axial bore extending therethrough and through the respective ends, said bore being internally screw-threaded, the threads terminating short of the respective ends of the dowel, and in combination, a jack screw adapted to be screwed through said bore, said jack screw having a tool socket at one end and a recess at the other end to accommodate an end thrust ball.

2. In combination, a first workpiece having a blind socket therein, opening through an edge of the workpiece, a second workpiece abutting the first workpiece and having a dowel accommodating hole therein aligned with said socket, a dowel pin bridging the joint between the respective workpieces and having one end portion fitted into the blind socket and the other end portion fitting into and extending through the hole, said dowel pin being hollow, that is, having an axial bore extending completely therethrough, said bore constituting an air escape vent, said bore being screw-threaded from end-to-end to accommodate an insertable and removable jack screw, and a jack screw having threads releasably engageable with the threads in said bore, said jack screw being of a length sufficient that one end thereof may be engaged with the bottom of a blind socket either directly or indirectly to facilitate dislodging, loosening and backing the dowel pin out of the socket.

3. For use in conjunction with a first workpiece provided with a blind socket opening through a surface of the workpiece, a second workpiece which may abut the first workpiece at the end thereof and having a dowel accommodating hole therein which may be aligned with the socket; an improved dowel pin construction comprising an elongated sleeve-like dowel having smooth exterior surfaces and an axial bore extending through the ends of the dowel and screw threaded from end to end with the screw threads terminating short of the respective ends of the dowel pin, said dowel pin being adapted to be fitted telescopically into the socket in a manner to bridge the joint between the respective workpieces, and an insertable and removable jackscrew having threads releasably engageable with the screw threads in said bore, said jackscrew being of a length that one end thereof may be engaged with the bottom of the blind socket either directly or indirectly and said one end being provided with a recess to accommodate a ball bearing, the other end of said jackscrew having a tool socket to facilitate use of a suitable tool in inserting and removing the jackscrew.

References Cited in the file of this patent

UNITED STATES PATENTS

| | | |
|---|---|---|
| 936,549 | Lundholm | Oct. 12, 1909 |
| 1,964,470 | King | June 26, 1934 |
| 2,208,014 | Brunson | July 16, 1940 |
| 2,358,783 | Best | Sept. 22, 1944 |
| 2,439,692 | McKay | Apr. 13, 1948 |
| 2,461,190 | Wolff | Feb. 8, 1949 |
| 2,488,214 | Marsilins | Nov. 15, 1949 |

FOREIGN PATENTS

| | | |
|---|---|---|
| 646,016 | France | Nov. 6, 1928 |